Sept. 2, 1941.  F. BAKER  2,254,640
SAFETY STEERING WHEEL
Filed June 17, 1936
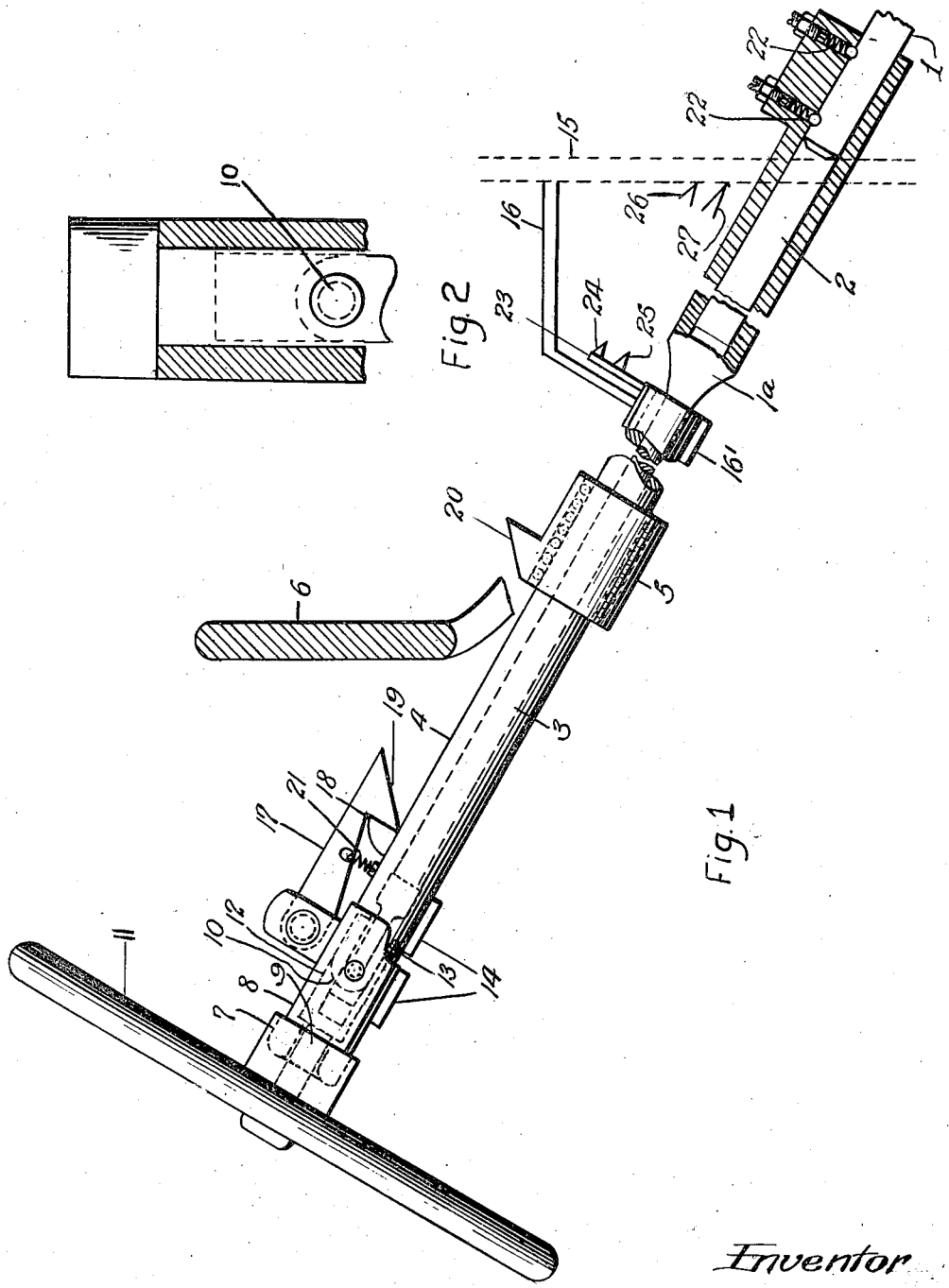
Inventor
Fred Baker Patented Sept. 2, 1941

2,254,640

UNITED STATES PATENT OFFICE 2,254,640

SAFETY STEERING WHEEL

Fred Baker, Milwaukee, Wis., assignor of two-thirds to Nathan Sherman and Victor Baker, Milwaukee, Wis.

Application June 17, 1936, Serial No. 85,651

2 Claims. (Cl. 74—493)

The present invention relates to steering apparatus and more particularly to an improved safety steering wheel for motor vehicles one of the objects of which is to provide a safety steering wheel which can readily be moved to a substantially vertical position relative to the vehicle front dash at any time desired.

Another object of the present invention is the provision of a novel safety steering wheel which can be readily positioned at various angles relative to the steering post and still be utilized for steering the vehicles.

A further object of the invention is to provide a safety steering wheel which, in case of accident, will be moved to a position substantially parallel to the instrument board or front of the vehicle so that in case of a sudden stop the person steering will not be thrown against the wheel but against the substantially flat face thereof.

A still further object is to provide novel construction to be embodied in the assembling of steering apparatus for motor vehicles whereby to permit the steering wheel to be moved to a substantially vertical position and substantially parallel to the front dash or instrument board of the vehicle.

Another object of the present invention is the provision of a safety steering wheel which can be moved to a position substantially parallel to the instrument board and includes means whereby the motor of the vehicle may be automatically stopped and the lights of the vehicle cut off and at the same time close a circuit to a flasher light which will act as a danger signal to approaching vehicles.

With the above and other objects in view the invention consists in the novel features of construction, the combination and arrangement of parts hereinafter more fully set forth and shown in the accompanying drawing, in which Figure 1 is a side elevation of a steering apparatus embodying my invention with parts thereof broken away and shown in cross section, and Figure 2 is a detail enlarged section showing the universal joint.

Referring more particularly to the drawing wherein I have illustrated one embodiment of the invention 1 indicates a connecting shaft having connection at one end with the steering rods connected to the front wheels of a vehicle and mounted upon the outer end of shaft 1 is a shaft 1a including a hollow end portion 2 slidably receiving the upper end of shaft 1. The shaft 1a has its outer end 3 reduced and of cylindrical form to receive thereon the supporting sleeve 4 slidably mounted in a collar 5 carried by the instrument panel 6. The sleeve 4 rides on ball bearings arranged between sleeve 4 and collar 5 as shown by dotted lines.

A cap 7 is fitted over the outer end of sleeve 8 and has arranged therein a stub shaft 9 which in turn is connected with the outer end 3 of shaft 1a by means of a universal joint 10. Attached to the cap 7 is the usual steering wheel 11, said wheel also having connection with stub shaft 9. The outer end of sleeve 4 has a rounded end portion as shown at 12 to permit free swinging movement of the sleeve 8 relative to sleeve 4. The inner end of sleeve 8 is cut away at one side thereof as shown at 13 to permit movement of said sleeve relative to sleeve 4. Suitable stop blocks 14 are properly positioned upon sleeves 4 and 8 to limit the downward swinging movement of sleeve 8 when released.

The front dash of a motor vehicle is illustrated by dotted lines as shown at 15 and supported thereon is a bracket 16 having a sleeve 16' which embraces sleeve 4 and is keyed thereto as shown. This not only aids in supporting the steering wheel but keeps the sleeve 4 from turning and thus releasing same as will be apparent later on in the description.

Pivotally mounted upon sleeve 8 is a catch member 17 which engages with a stop 18 on sleeve 4 in order to maintain the sleeve 8 and steering wheel 11 in their normal operative positions as shown in Figure 1. This catch member 17 is released from stop 18 when sleeve 4 is moved downwardly relative to shaft 1 to permit the steering wheel to drop downwardly to a position substantially parallel to the instrument panel of the vehicle. It will be noted that catch member 17 has an inclined beveled face 19 adapted to engage a similar face 20 carried by collar 5 so that when catch 17 engages the beveled face 20 the catch will be quickly released from stop 18. The catch 17 is normally maintained in engagement with stop 18 by means of coil spring 21.

The shaft 1a is maintained in a raised position as shown in Figure 1 by means of the spring pressed balls 22 normally seated in recesses of shaft 1. However, when the shaft 1a is forced downwardly on shaft 1 the balls 22 will be unseated and ride on the outer surface, but will readily seat themselves when shaft 1a is again moved to a raised position.

In case of accident it will be to advantage to have the motor stopped at once and to this end a contact arm 23 is attached to sleeve 4 which carries contact points 24 and 25. Attached to the front dash of the vehicle are spaced contact sockets 26 and 27 to be engaged or received by points 24 and 25 respectively. Socket 26 is connected with means to short circuit the motor and the usual lights of the vehicle while socket 27 is connected to a flasher light to be used as a danger signal for warning approaching vehicles of the presence of a disabled vehicle.

Heretofore when a motor vehicle struck an object the shock has usually thrown the operator against the steering wheel so that the edge of the wheel would strike the operator in the abdomen and generally result in serious injury. With the present invention the steering wheel will be moved to such a position that the flat side thereof will contact the operator and reduce the injury to a minimum.

In the operation of my device it will be apparent that when the vehicle strikes an object the pressure of the operator's hands on the steering wheel will force sleeves 4 and 8 downwardly causing bevel face 19 to contact face 20 releasing catch 17 from stop 18 permitting sleeve 8 to drop with steering wheel 11 until the wheel assumes a position substantially parallel to the front dash of the vehicle so that a substantially flat face of the wheel will be facing the operator.

In the case of a comparatively heavy or forced contact of the vehicle with an object shaft 1a will be moved downwardly over shaft 1 unseating balls 22. This will bring contacts 24 and 25 into engagement with sockets 26 and 27, thus cutting off the motor and usual lights and closing a circuit to the flasher light. It will be apparent from the foregoing that there are a good many advantages to my improved safety steering wheel. The usual injury resulting from the operator's contact is reduced and the signal will prevent approaching vehicles from striking the disabled vehicle.

While I have shown and described the preferred embodiment of my invention it will be apparent that various changes can be made when putting the invention into practice without departing from the spirit of the invention or the scope of the appended claims.

I claim:

1. A device of the class described including a connecting shaft, a second shaft movable longitudinally relative thereto, a sleeve on the second shaft, a second sleeve on the outer end of the first sleeve, a cap fitted over the outer end of the second sleeve, a stub shaft within the second sleeve, means universally connecting the stub shaft with the outer end of the aforementioned second shaft, a steering wheel carried by said cap, means operated upon movement of the second shaft and steering wheel relative the connecting shaft for releasing the wheel to permit the same to swing to a position substantially parallel to the front dash of a vehicle and stop blocks carried by said first and second sleeves respectively for limiting the swinging movement of the steering wheel.

2. A device of the class described including a connecting shaft, a second shaft movable longitudinally relative thereto, a sleeve on the second shaft, a second sleeve on the outer end of the first sleeve, a cap fitted over the outer end of the second sleeve, a stub shaft within the second sleeve, means universally connecting the stub shaft with the outer end of the aforementioned second shaft, a steering wheel carried by said cap, a catch member carried by the second sleeve, having a beveled face, a stop carried by the first sleeve to be engaged by the catch to retain the steering wheel against movement relative the first sleeve, stationary means to be engaged by the face of the catch for disengaging the same from the stop upon longitudinal movement of the parts upon the connecting shaft to permit the steering wheel to swing to a position substantially parallel to the front dash of a vehicle, and means for limiting the swinging movement of the steering wheel.

FRED BAKER.